Figure 1:
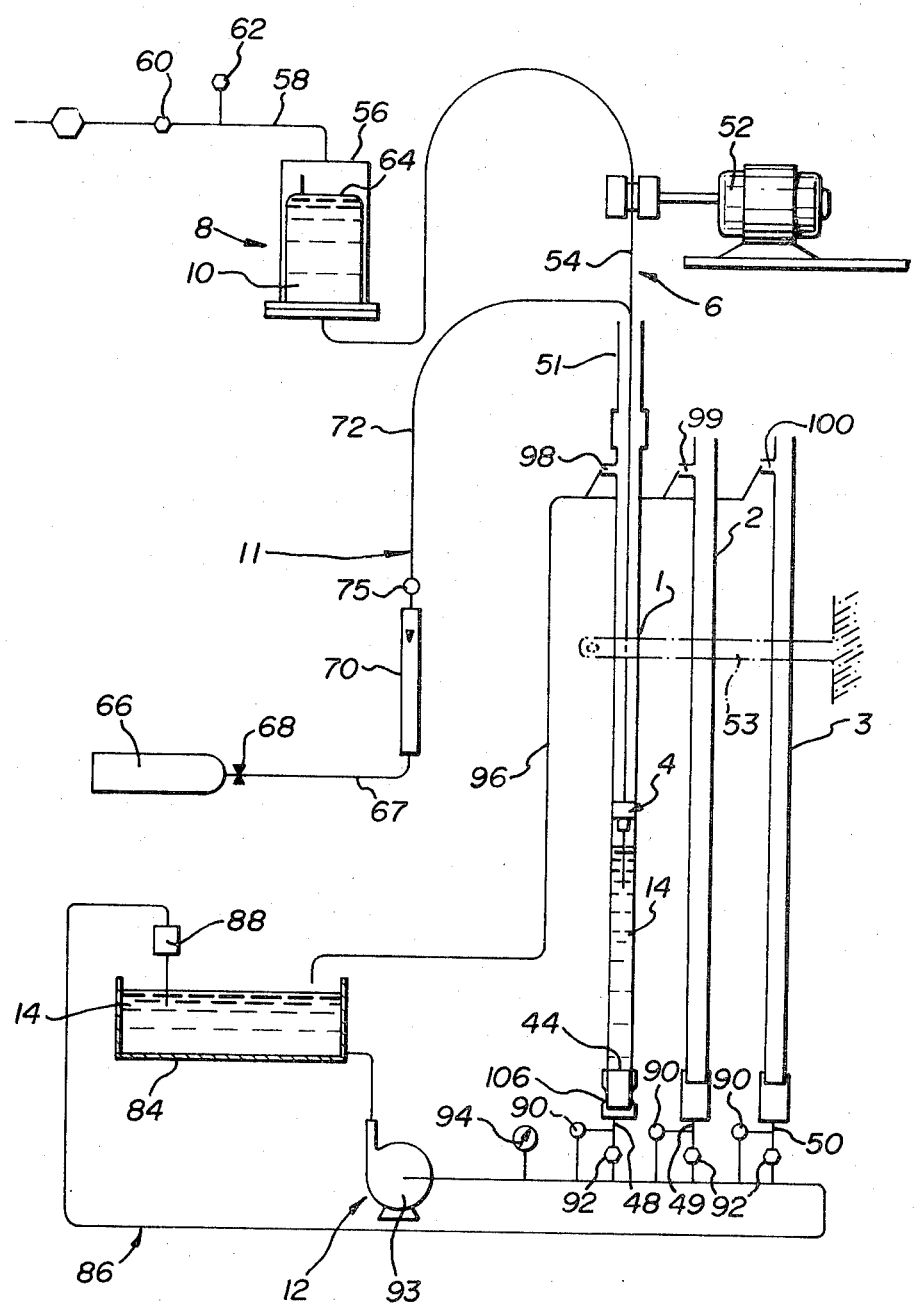

United States Patent [19]

Thayer et al.

[11] 4,177,031
[45] Dec. 4, 1979

[54] APPARATUS FOR CASTING TUBULAR, POLYMERIC MEMBRANES FOR REVERSE OSMOSIS AND ULTRAFILTRATION

[75] Inventors: William L. Thayer; Lucien Pageau; Srinivasa Sourirajan, all of Ottawa, Canada

[73] Assignee: Canadian Patents and Development Limited, Ottawa, Canada

[21] Appl. No.: 883,267

[22] Filed: Mar. 3, 1978

[51] Int. Cl.² .................. B29D 23/08; B29D 27/04
[52] U.S. Cl. ........................... 425/460; 210/500 M; 264/40.4; 264/41; 264/299; 425/147
[58] Field of Search ................ 264/41, 49, 269, 267, 264/299, 40.4; 425/59, 62, 90, 102, 103, 122, 127, 129, 135, 460, 147; 210/500 M

[56] References Cited

U.S. PATENT DOCUMENTS

| | | | |
|---|---|---|---|
| 3,387,348 | 6/1968 | Kilgallon | 264/269 X |
| 3,446,359 | 5/1969 | Loeb et al. | 264/49 X |
| 3,524,757 | 8/1970 | Havens | 264/41 X |
| 3,544,358 | 12/1970 | Manjikian | 264/41 X |
| 3,676,193 | 7/1972 | Cooper et al. | 264/41 X |
| 3,929,945 | 12/1975 | Thayer et al. | 264/41 |
| 4,067,675 | 1/1978 | Hanson | 425/59 |

FOREIGN PATENT DOCUMENTS 547821  9/1942  United Kingdom .................. 264/269

*Primary Examiner*—Philip Anderson
*Attorney, Agent, or Firm*—F. W. Lemon

[57] ABSTRACT

An apparatus for casting tubular polymeric membranes for reverse osmosis and ultrafiltration which includes a plurality of upwardly extending casting tubes, a manifold with branch outlets for mounting the casting tubes to extend upwardly therefrom, a casting bob assembly comprising a centering sleeve with a screw threaded bore and cylindrical extension, a casting bob screwed into the centering sleeve and having casting solution outlet ports to an annular gap between the casting bob and the casting sleeve, the annular gap being adjustable by screwing the casting bob into and out of the centering sleeve, and a transport sleeve which is pressed on to the casting bob and the cylindrical extension of the centering sleeve for transporting the assembly from one casting tube to another between casting operations and a flexible sleeve and a hose clamp for releasably securing the transport sleeve in a lower end of each casting and sealing the lower ends of each casting tube to a branch outlet.

2 Claims, 6 Drawing Figures

APPARATUS FOR CASTING TUBULAR, POLYMERIC MEMBRANES FOR REVERSE OSMOSIS AND ULTRAFILTRATION

This invention relates to an apparatus for casting tubular, polymeric membranes for reverse osmosis and ultrafiltration.

U.S. Pat. No. 3,929,945, dated Dec. 30, 1975, "Method For Making Tubular Polymeric Membranes For Reverse Osmosis," W. Thayer, L. Pageau and S. Sourirajan, describes a method of making tubular, polymeric membranes for reverse osmosis wherein a leading bob and a casting bob suspended therefrom are used to cast the tubular polymeric membrane along the bore of an upwardly extending casting tube while a gelation medium is circulated inside the cast membrane and preferably air is circulated along the inside of the freshly cast membrane, above the gelation medium. The leading bob has a cylindrical casing depending therefrom which sits on and seals to the casting bob. The cylindrical casing is initially filled with casting solution and during casting it is raised to be spaced from the casting bob to release the casting solution so that casting solution flows down around the casting bob as it is cast into the tubular, polymeric membrane. Thus the leading bob, cylindrical casing and the casting bob form a means for storing casting solution prior to casting the tubular, polymeric membrane.

The method described in U.S. Pat. No. 3,929,945 of casting a tubular, polymeric membrane has been shown to be very useful for casting tubular, polymeric membranes from casting solutions which previously could not be used. However, no provision is made for adjusting the flow of the casting solution, thus making the apparatus suitable for use with a wide range of casting solution viscosities necessary for both reverse osmosis and ultrafiltration membranes or for switching from casting one tubular, polymeric membrane in one casting tube to the casting of another tubular polymeric membrane in another casting tube without the need for an intermediate time consuming operation of cleaning the casting bob assembly.

It is an object of the present invention to provide an apparatus for casting a tubular, polymeric membrane for reverse osmosis wherein provision is made for adjusting the flow of the casting solution, thus making the apparatus suitable for use with a wide range of casting solution viscosities necessary for both reverse osmosis and ultrafiltration membranes, and provision is also made for switching from casting one tubular, polymeric membrane in one casting tube to the casting of another tubular, polymeric membrane in another casting tube without the need for an intermediate time consuming operation of cleaning the casting bob assembly.

According to the present invention, in an apparatus for casting tubular, polymeric membranes for reverse osmosis and ultrafiltration, comprising:

(a) a plurality of upwardly extending casting tubes, (b) a casting bob assembly for insertion in the lower end of the bore of each of the casting tubes, (c) mounting means for mounting each casting tube, with the casting bob assembly in the lower end thereof, for relative movement therebetween, whereby the casting bob assembly may be displaced along the bore of each casting tube when placed therein, (d) means for supplying a casting solution to the casting bob assembly, (e) means for supplying a gas to the bore of each casting tube, below the casting bob assembly, when the bob assembly is inserted therein and (f) means for feeding a gelation liquid to the bore at the lower end of each casting tube when the casting bob assembly is inserted therein, and wherein (g) the casting bob assembly comprises:

(i) a centering sleeve, slidable along the bore of each casting tube, and having an open ended, upwardly extending bore, at least a portion of which is screw threaded, and a lower, cylindrical extension inwardly spaced from each casting tube when placed therein, (ii) a casting bob having an upper portion which has a downwardly extending casting solution passage therethrough and which is screw threaded externally with the screw thread screwed into the screw threaded portion of the centering sleeve, an intermediate portion which is integral with the upper portion and protrudes from a lower end of the bore of the centering sleeve and defines an annular, casting solution outlet with the centering sleeve, the intermediate portion having casting solution passage means for distributing around the annular, casting solution outlet, casting solution from the downwardly extending passage, and a lower cylindrical portion integral with the intermediate portion and beneath the cylindrical extension and defining an annular, casting solution outlet gap therewith which is adjustable by screwing the upper portion into the centering sleeve, the lower portion being spaced from casting tube when placed therein to define an annular casting space therewith, the improvement comprising:

(h) the casting bob assembly includes:

(i) a transport sleeve slidable upwardly as a press fit around the lower portion of the casting bob to seal against and around the lower, cylindrical extension and seal the annular, casting solution outlet gap while the casting bob assembly is being transported from one casting tube to another, the transport sleeve being slidable along the bore of each casting tube when inserted therein, and (ii) securing means for releasably securing the transport sleeve in the lower end of each casting tube and sealing the lower end of each casting tube to the mounting means.

Figure 2:
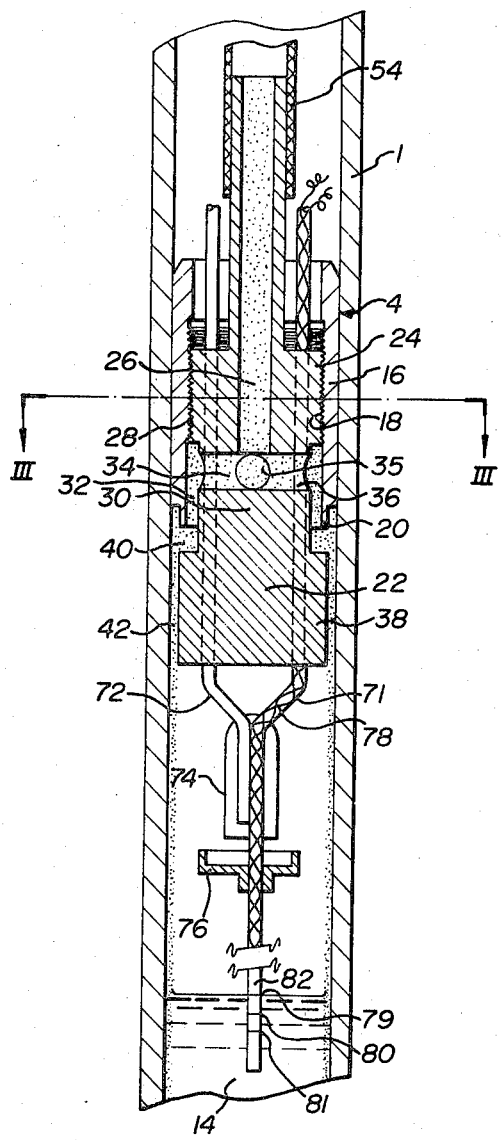
Figure 3:
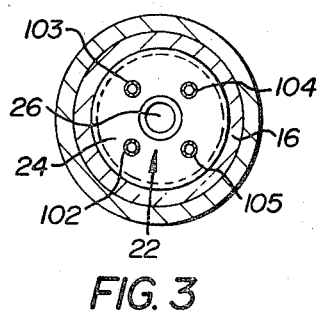
Figure 4:
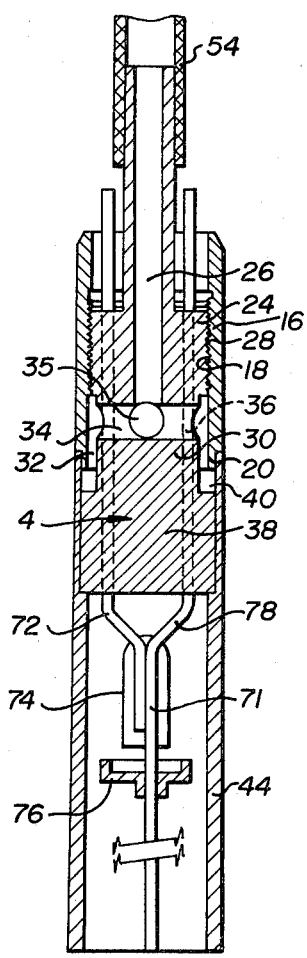
Figure 6:
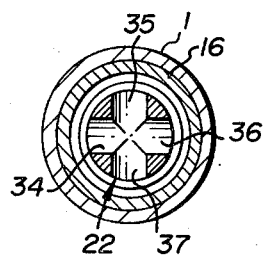
Figure 5:
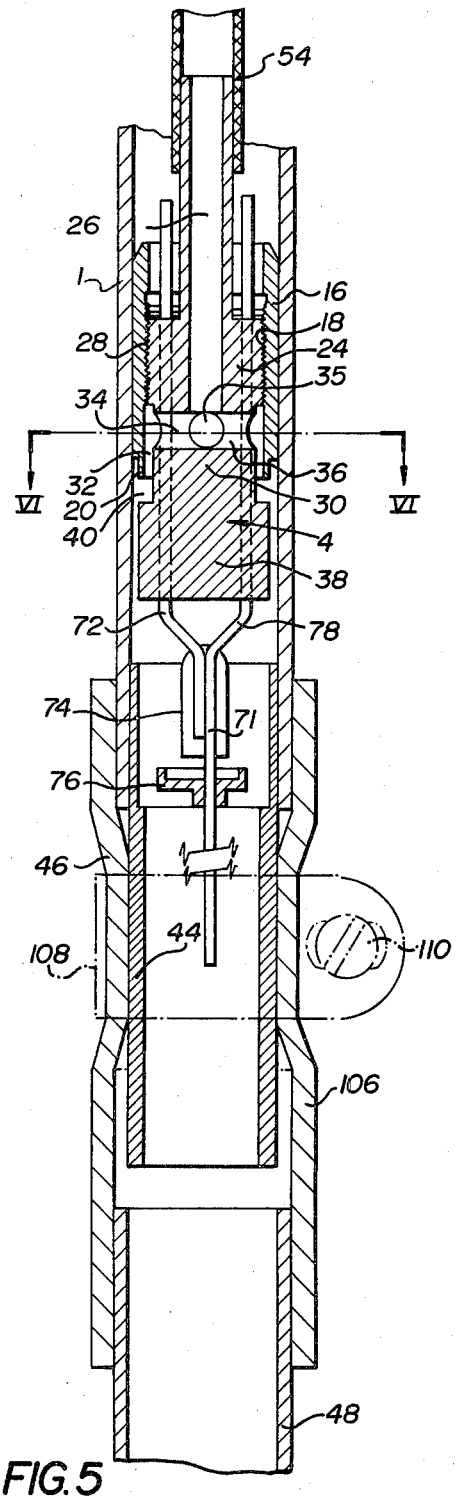

In the accompanying drawings which illustrate, by way of example, an embodiment of the present invention, FIG. 1 is a diagrammatic view of an apparatus for casting a tubular, polymeric membrane for reverse osmosis and ultrafiltration, FIG. 2 is an enlarged, sectional side view of a casting bob assembly in a portion of a casting tube shown in FIG. 1, FIG. 3 is a sectional end view along III—III, FIG. 2 with a casting bob of the casting bob assembly shown in full, FIG. 4 is a sectional side view of the casting bob assembly shown in FIGS. 1 to 3 removed from the casting tube and sealed by a transport sleeve, FIG. 5 is a similar sectional side view to that shown in FIG. 4 but with the transport sleeve displaced from the casting bob assembly to release casting solution, and FIG. 6 is a sectional end view along VI—VI, FIG. 5.

Referring now to FIGS. 1 to 6 there is shown in an apparatus for casting a tubular polymeric membrane for reverse osmosis and ultrafiltration comprising:

(a) a plurality of upwardly extending casting tubes such as 1, 2 and 3 (FIGS. 1, 2 and 5), (b) a casting bob assembly 4 (FIGS. 1 to 6) for insertion in the lower end of the bore of each of the casting tubes 1, 2 and 3, (c) mounting means generally designated 6 (FIG. 1) for mounting each casting tube such as 1, 2 and 3, with the casting bob assembly 4 in the lower end thereof for relative movement therebetween, whereby the casting bob assembly 4 may be displaced along the bore of each casting tube 1, 2 and 3 when placed therein, (d) means generally designated 8 (FIG. 1) for supplying a casting solution 10 to the casting bob assembly 4, (e) means 11 (FIG. 1) for supplying a gas to the bore of each casting tube 1, 2 and 3, below the casting bob assembly 4, when the casting bob assembly 4 is inserted therein, (f) means 12 (FIG. 1) for feeding a gelation liquid 14 to the bore at the lower end of each casting tube 1, 2 and 3 when the casting bob assembly 4 is inserted therein, and wherein:

(g) the casting bob assembly 4 comprises:

(i) a centering sleeve 16 (FIGS. 2 to 6), slidable along the bore of each casting tube 1, 2 and 3, and having an open ended and upwardly extending bore, at least a portion 18 of which is screw threaded, and a lower, cylindric extension 20 inwardly spaced from each casting tube 1, 2 or 3 when placed therein, (ii) a casting bob 22 having an upper portion 24 which has a downwardly extending casting solution passage 26 therethrough and is screw threaded externally at 28 with the screw thread 28 screwed into the screw threaded portion 18 of the centering sleeve 16, an intermediate portion 30 (FIGS. 2, 4 and 5) which is integral with the upper portion 24 and protrudes from a lower end of the bore of the centering sleeve 16 and defines an annular, casting solution outlet 32 with the centering sleeve 16, the intermediate portion 30 having casting solution passage means in the form of ports 34 to 37 (FIGS. 2 and 4 to 6) for distributing around the annular casting solution outlet 32, casting solution from the downwardly extending passage 26, and a lower cylindrical portion 38 integral with the intermediate portion 30 and beneath the cylindrical extension 20 and defining an annular, casting solution outlet gap 40 therewith which is adjustable by screwing the upper portion 24 into the centering sleeve 16, the lower portion 38 being spaced from casting tube 1, 2 or 3 when placed therein to define an annular casting space 42 (FIG. 2) therewith, the improvement comprising (h) the casting bob assembly 4 includes:

(i) a transport sleeve 44 (FIGS. 4 and 5) slidable upwardly as a press fit around the lower portion 38 of the casting bob 22 to seal against and around the lower, cylindrical extension 20 and seal the annular, casting solution outlet gap 40 while the casting bob assembly 4 is being transported from one casting tube such as that designated 1 (FIG. 1) to another casting tube such as that designated 2, the casting sleeve 44 being slidable along the bore of each casting tube 1, 2 and 3 when inserted therein, and (ii) securing means 46 (FIG. 5) for releasably securing the transport sleeve 44 in the lower end of each casting tube 1, 2 and 3 and sealing the lower end of each casting tube 1, 2 and 3 to the mounting means 6.

The casting bob 22 may be machined from brass and the centering sleeve 16 may be made from a plastic material such as nylon (Trade Mark).

As shown in FIG. 1 each casting tube 1, 2 and 3 is mounted and sealed to manifold branch outlet 48, 49 and 50 respectively, in a manner that will be described later. The casting tube 1 has a landing area 51. The manifold branch outlets 48, 49 and 50 form part of the mounting means 6. The mounting means 6 also comprises a clamp 53 supporting the casting tubes 1, 2 and 3 and a winch assembly 52 which raises the casting bob assembly 4 by means of a reinforced, flexible plastic tube 54 coiled therearound and leading from the means 8 to the passage 26 (FIGS. 2, 4 and 5) in the upper portion 24 of the casting bob 22 (FIGS. 2, 4 and 5).

The means 8 (FIG. 1) for supplying the casting solution 10 to the casting bob assembly 4 by means of the plastic tube 54 comprises a pressure vessel 56 for connection to a source (not shown) of highly pressurized fluid (e.g. air or nitrogen) by means of a pipe 58 containing a pressure control valve 60 and a pressure relief valve 62. The pressure vessel 56 has a plastic bag 64 of nearly equal volume to that of the vessel 56. The plastic bag 64 contains the casting solution 10. An open end of the plastic bag 64 is sealed to a wall of the pressure vessel 56 around an outlet therefrom for casting solution to the flexible plastic pipe 54. The object of the plastic bag 64 is to prevent direct contact between the casting solution 10 and pressurized fluid (e.g. air or nitrogen) from the pipe 58 which is used to eject the casting solution from the plastic bag 64 and would otherwise dissolve into the casting solution 10. The pressure vessel 56 may be jacketed with thermal insulation to maintain the casting solution 10 at the desired temperature. The plastic bag 64 also prevents corrosion of the pressure vessel 56 by the casting solution 10.

The means 11 for supplying a gas (e.g. air) to the bore of each casting tube 1, 2 and 3, below the casting bob assembly 4, comprises an air cylinder 66, plastic piping 67, regulating valve 68 and a flow meter 70 which feed air below the casting bob assembly 4, by means of a stainless steel pipe 72 extending therethrough, to a hood 74 (FIGS. 2, 4 and 5) mounted above an air distributor 76. A valve 75 is provided for isolating the flow meter 70. The hood 74 is suspended by means of the stainless steel pipe 72 and another stainless steel pipe 71 containing an electrical cable 78 is connected to liquid level sensors 79 to 81 of a probe 82 of known type attached to the end of the stainless steel pipe 71. As will be described later the liquid level sensors 79 to 81 sense the level of gelation liquid in the casting tube, within a predetermined range of distances beneath the casting bob assembly 4 during casting. The stainless steel tube 71 supports the air distributor 76 in position beneath the hood 74.

The means 12 for feeding a gelation liquid (e.g. water) to the bore at the lower end of each casting tube 1, 2 and 3 comprises a water tank 84 having a closed loop, flooded pumping circuit consisting of piping 86, valve means in the form of valves 88, 90 and solenoid valves 92, a pump 83, a pressure gauge 94 and an overflow pipe 96 collecting overflowing liquid from outlet pipes 98 to 100 attached to upper end portions of the casting tubes 1, 2 and 3 respectively.

The electrical cable 78 (FIGS. 2, 4 and 5) is connected by control means (not shown) of known type which actuates the solenoid valves 92 (FIG. 1) in a known manner in response to signals from the liquid level sensors 79 to 81 (FIG. 2) to control the level of the gelation liquid 14 (FIGS. 1 and 2) in the casting tubes 1, 2 and 3.

The casting bob 22 has four holes 102 to 105 (FIGS. 3 and 6) extending therethrough. The hole 102 is for the stainless steel air pipe 72. The hole 104 is for the stainless steel tube 71 for the electrical cable 78. The holes 103 and 105 are for the escape of air.

The transport sleeve 44 (FIGS. 4 and 5) is made of brass or rigid plastic material. The securing means 46 comprises a flexible tube 106 and a hose clamp 108 (shown chain-dotted) provided with a clamping screw 110.

In operation flexible tubes or sleeves such as 106, with hose clamp 108 loose thereon, are pressed over the manifold branch outlets 48 to 50 and the lower ends of casting tubes 1, 2 and 3. The transport sleeve 44 is pressed over the end of the casting bob assembly 4 as shown in FIG. 4 after the casting tube gap 40 has been adjusted to suit the particular casting solution to be cast. The casting bob assembly 4 with the transport sleeve 44 thereon is then lowered down the casting tube 1 into the flexible tube or sleeve 106 so that the transport sleeve 44 is surrounded by the flexible tube or sleeve 106. The hose clamp 108 is then tightened in the position shown in FIG. 5 by the clamping screw 110 so that the transport sleeve 44 is firmly held against movement by the flexible tube or sleeve 106.

Gelation water which also in this embodiment acts as a leaching liquid, is then fed to the lower end of the casting tube 1 by the means 12 and the plastic bag 64 is pressurized to feed casting solution to the casting bob assembly 4. Air is fed to the casting bob assembly 4 from the air cylinder 66.

The winch assembly 52 is then actuated to pull the casting bob assembly 4 up the casting tube 1 by the reinforced, flexible plastic tube 54. The pull on the casting bob assembly 4 pulls the centering sleeve 16 and the casting bob 22 out of the transport sleeve 44, leaving the transport sleeve 44 firmly held by the flexible tube or sleeve 106 as shown in FIG. 5, so that casting solution from the pressure vessel 56 (FIG. 1) flows out of the ports 34 to 37 (FIG. 2) and down the casting space 42 between the casting tube 1 and the casting bob 22 to be cast as a tubular polymeric membrane lining along the inner wall of the tube 1.

Air from the cylinder 66 issues from the pipe 72 and is deflected by the air distributor 76 to flow gently and uniformly agains the newly cast membrane and evaporate solvent therefrom in a controlled manner. The solvent laden air is swept out through the holes 103 and 105 (FIGS. 3 and 6) by fresh incoming air from the pipe 72.

As the casting bob assembly rises up the casting tube 1 ice cold water as a gelation liquid is pumped from the tank 84 by means of pump 93 into the casting tube beneath the casting bob assembly 4. The level of the water is controlled by the liquid level sensors 79 to 81 which actuate the solenoid valve 92 in a known manner to draw ice cold water that is continuously being pumped by pump 93 to and from the tank 84 at 15 psig ($=1.05$ kg/cm$^2$ gauge).

When the casting assembly 4 reaches the landing area 51, which may take a few seconds, the winch assembly 52 is stopped, the pressurized fluid supply to the pressure vessel 56 is stopped thereby stopping the flow of casting solution 10 to the casting bob assembly 4, the air flow from the cylinder 66 is stopped and the liquid level sensors 79 to 81 are deactivated. Water from the tank 84 is still circulated into the casting tube 1 by opening valve 90 but now the water overflows from the overflow 98 and is returned to the tank 84 by the overflow pipe 96.

The casting bob assembly 4 is now pulled out of the casting bob 1 and a transport sleeve similar to transport sleeve 44 is slid over the casting bob assembly 4 as shown in FIG. 4. The casting bob assembly 4 with the transport sleeve is wiped, a landing area similar to landing area 51 is fitted on casting tube 2 and then the casting bob assembly 4 with the transport sleeve is lowered down the casting tube 2 to cast a tubular, polymeric membrane therein in the same manner as that described with reference to casting tube 1.

The same sequence of operations is then performed to cast a tubular, polymeric membrane in the casting tube 3 sealed on the manifold branch outlet 50. In practice a lot more than three manifold branch outlets are provided.

During casting the viscosity of the casting solution 10 (FIG. 1), the width of the casting solution gap 40 (FIGS. 2, 4 and 5), and the casting speed together determine the pressure of the pressurized fluid to drive the casting solution 10 at the proper rate of flow from the plastic bag 64 to the casting bob assembly 4. This fluid pressure may vary from 15 psig ($=1.05$ kg/cm$^2$ gauge) for very dilute casting solutions to 300 psig ($=21.09$ kg/cm$^2$ gauge) for highly viscous casting solutions.

The purpose of the liquid level sensors 79 to 81 (FIG. 2) is to maintain in the freshly cast, tubular polymeric membrane a desired length (or time) of air (gas or vapor) zone by holding the water level at a particular distance from the bottom of the casting bob 22. The liquid level sensors 79 to 81 are adjustable to maintain a range of water levels from more or less zero distance from the casting bob 22. The combined use of air from the pipe 72 and an adjustable water level offers a versatile means of controlling both the rate of solvent removal from the freshly cast tubular, polymeric membrane surface and the rate of gelation of the entire cast tubular, polymeric membrane, which together control the overall porosity of the resulting tubular, polymeric membrane for reverse osmosis or ultrafiltration.

The centering sleeve 16 (FIG. 2) has the following functions:

(i) the centering sleeve 16 centers the casting bob 22 in the casting tube 1.

(ii) The centering sleeve 16 together with the casting bob 22 regulates the rate of flow of the casting solution during casting. This may be adjusted by screwing the casting bob 22 up or down in the centering sleeve 16.

(iii) The centering sleeve 16 serves as a cap to seal the casting solution within the casting bob 22 when the casting bob assembly 4 is not in use by simply screwing the casting bob 22 sufficiently into the centering sleeve 16 to completely close the gap 40 (FIG. 2).

The transport sleeve 44 has the following functions:

(i) It makes it possible to switch from one tube casting to the next immediately without loss of time.

(ii) It eliminates any wastage of casting solution.

(iii) It prevents unnecessary contacts of the casting solution with the next casting tube prior to film casting.

The liquid level sensors 79 to 81 function as follows:

(i) When both of the sensors 80 and 81 are not submerged in water, the solenoid valve 92 is opened to let water into the casting tube 1.

(ii) When both of the liquid level sensors 79 and 80 are submerged in water, the solenoid valve 92 is closed to stop water flowing into the casting tube 1.

(iii) When the liquid level sensor 81 alone is submerged in water, the solenoid valve 92 is opened.

Thus a liquid level between the two sensors 79 and 81 is always maintained.

The casting tubes 1 and 2 may be made from glass or metal. Metal casting tubes 1 and 2 are preferred for industrial use because they are easier to obtain commercially with a bore of uniform diameter. The apparatus described with reference to FIGS. 1 to 6 was designed for casting one inch (2.54 cm) diameter tubular polymeric membranes but is not limited to producing such membranes. While any length of casting tube 1, 2 and 3 may be used a length in the range four feet to twenty feet is preferred to ensure that tubular polymeric membranes are produced having sufficiently uniform porosity for use in an industrial manner as reverse osmosis or ultrafiltration membranes.

Any number of casting tubes can be used because there is practically no less of time between casting operations. The number of casting tubes used is limited only by the quantity of casting solution available from the plastic bag 64 (FIG. 1) and a suitable manifold arrangement for the gelation liquid from the tank 84.

The winch assembly 52 is preferably driven by a variable speed electric motor so that the casting operation is carried out at the desired speed. The winch assembly 52 is preferably positioned so that the tube 6 is raised or lowered vertically from the casting tube 1.

In the operation of the process, a high degree of automation is possible, so that all steps in the casting process for the entire set of tubular polymeric membranes can be accomplished by the flip of a single electrical switch. For the practical demonstration of the casting process, a single casting tube 1 was used, and automation was built into the electrical circuit with respect to air flow rate, film casting speed, the fluid pressure needed to drive the casting solution to the casting bob assembly 4, and activation of the liquid level sensors 79 to 81. This means that by operating a single master switch, preset conditions for the above four variables are automatically maintained during the casting operation. A separate switch was used for operating the gelation water pump 93.

A set of performance data of the tubular membranes made by the above process using the apparatus described with reference to FIGS. 1 to 6 is given in the following Table 1.

The results given in Table 1 involve three different compositions (batch-47, -320, and -U17) and two different temperatures (0° C. and 22° C.) for the casting solutions. Besides cellulose acetate and acetone, the casting solutions used contained either formamide or aqueous magnesium perchlorate both of which are in common use in industrial practice. Further, the cellulose acetate polymer used in the casting solutions was of the viscosity grade 3 or 25. These data are intended to show that neither the composition of the casting solution, nor its temperature, nor the viscosity grade of the polymer used is a limitation for the successful use of the process.

Batch-47 and batch-320 compositions are particularly suitable for making tubular reverse osmosis membranes containing relatively smaller size pores on the membrane surface. Batch-U17 tubular membranes are particularly suitable for making relatively bigger pore size ultrafiltration, tubular membranes. The data given in Table 1 show that both reverse osmosis and ultrafiltration membranes can be made by the apparatus by the appropriate choice of the film casting solution and film casting conditions.

The solute separation and water flux data given in Table 1 do not represent any limits set by the apparatus on the tubular membrane performance, nor is the process limited by the obtainable solute separation and water flux data. The latter two variables are controlled entirely by the choice of the composition of the film casting solution, and the choice of the particular film casting conditions. For example, using a casting solution composition different from the ones given in Table 1, tubular cellulose acetate membranes were made by the above apparatus under three different casting conditions. The tubular membranes were then tested without any preshrinking at only 100 psig (=7.03 kg/cm$^2$) operating pressure using 200 ppm magnesium sulfate-water feed solutions at the same feed flow conditions. The following results were obtained: tubular membranes cast under the first set of conditions gave 85% separation for magnesium sulfate (equivalent to ~50% separation of sodium chloride for comparable NaCl-H$_2$O feed Table 1

| | | | ILLUSTRATIVE RESULTS WITH TUBULAR MEMBANES | | | | |
|---|---|---|---|---|---|---|---|
| Batch No. | Temp. of casting solution °C. | Casting speed cm/sec | Air flow rate liters/min | Evaporation time sec | Film shrinkage temp. °C. | Solute separation[a] % | Water Flux[a] | |
| | | | | | | | gal/day per ft$^2$ | m$^3$/day per m$^2$ |
| 47[b] | 22 | 5.08 | 4.475 | 3 | unshrunk | 42.4 | 81.7 | 3.333 |
| | | | | | 62 | 76.7 | 53.8 | 2.195 |
| | | | | | 70 | 85.6 | 43.6 | 1.779 |
| | | | | | 78 | 91.9 | 30.0 | 1.224 |
| 320[b] | 0 | 5.08 | 4.475 | 3 | unshrunk | 42.0 | 85.0 | 3.468 |
| | | | | | 62 | 72.5 | 49.0 | 1.999 |
| | | | | | 70 | 85.0 | 38.0 | 1.550 |
| | | | | | 76 | 92.5 | 30.0 | 1.224 |
| U17[b] | 0 | 7.62 | 22.06 | 3 | unshrunk | 16.4 | 190.6 | 7.776 |
| U17[b] | 22 | 7.62 | 11.81 | 3 | unshrunk | 7.7 | 233.1 | 9.510 |

[a]Feed solution, 5000 ppm NaCl—H$_2$O; operating pressure, 600psig (=42.18 kg/cm$^2$) gauge; feed flow rate, 11.4 liters/min.
[b]Compositions (wt percent) of casting solutions tested:

| | Batch-47 | Batch-320 | Batch-U17 |
|---|---|---|---|
| Cellulose acetate, E-398-3 | 25 | — | 15.5 |
| Cellulose acetate, E-340-25 | — | 17 | — |
| Acetone | 45 | 69.2 | 65.9 |
| Formamide | 30 | 13 | — |
| Magnesium perchlorate | — | 1.45 | 1.96 |
| Water | — | 12.35 | 16.64 | solution) with a water flux of 33 gal/day ft$^2$ (=1.3464 m$^3$/day m$^2$); tubular membranes cast under the second set of conditions gave 11% separation for magnesium sulfate (equivalent to ~5% separation for sodium chloride) with a water flux of 107 gal/day ft$^2$ (=4.3656 m$^3$/day m$^2$); and the tubular membranes cast under the third set of conditions gave 1% separation for magnesium sulfate with a water flux of 200 gal/day ft$^2$ (=8.160 m$^3$/day m$^2$). These data are significant. The first set of casting conditions is of importance for the manufacture of reverse osmosis tubular membranes; the second and third sets of casting conditions are of importance for the manufacture of ultrafiltration tubular membranes. All the above data illustrate the practical utility and versatility of the process for making tubular cellulose acetate reverse osmosis and ultrafiltration tubular membranes.

In other embodiments the hose clamps 108 are replaced by solenoid clamps which are automatically actuated prior to the casting operation in the associated casting tube.

In some embodiments of the present invention the air circulation may be enhanced by providing air inlet ports to the portion of the bore of the pipe 71 beneath the air distributor 76 so that a portion of the air gently flows downwardly around the air distributor 76 and exits along the bore of the pipe 71.

In other embodiments of the present invention, the casting operation is carried out by lowering the casting tubes 1, 2 and 3 in which a membrane is being cast while the casting bob assembly 4 is either held stationary or raised.

We claim:

1. In an apparatus for casting tubular, polymeric membranes for reverse osmosis and ultrafiltration, comprising:
   (a) a plurality of upwardly extending casting tubes,
   (b) a casting bob assembly for insertion in the lower end of the bore of each of the casting tubes,
   (c) mounting means for mounting each casting tube, with the casting bob assembly in the lower end thereof, for relative movement therebetween, whereby the casting bob assembly may be displaced along the bore of each casting tube when placed therein,
   (d) means for supplying a casting solution to the casting bob assembly,
   (e) means for supplying a gas to the bore of each casting tube, below the casting bob assembly, when the casting bob assembly is inserted therein,
   (f) means for feeding a gelation liquid to the bore at the lower end of each casting tube when the casting bob assembly is inserted therein, and wherein:
   (g) the casting bob assembly comprises:
      (i) a centering sleeve, slidably along the bore of each casting tube, and having an open ended, upwardly extending bore, at least a portion of which is screw threaded, and a lower cylindrical extension inwardly spaced from each casting tube when placed therein,
      (ii) a casting bob having an upper portion which has a downwardly extending casting solution passage therethrough and which is screw threaded externally with the screw thread screwed into the screw threaded portion of the centering sleeve, an intermediate portion which is integral with the upper portion and protrudes from a lower end of the bore of the centering sleeve and defines an annular, casting solution outlet with the centering sleeve, the intermediate portion having casting solution passage means for distributing around the annular casting solution outlet, casting solution from the downwardly extending passage, and a lower cylindrical portion integral with the intermediate portion and beneath the cylindrical extension and defining an annular, casting solution outlet gap therewith which is adjustable by screwing the upper portion into the centering sleeve, the lower portion being spaced from casting tube when placed therein to define an annular casting space therewith, the improvement comprising:
   (h) the casting bob assembly includes:
      (i) a transport sleeve slidable upwardly as a press fit around the lower portion of the casting bob to seal against and around the lower, cylindrical extension and seal the annular, casting solution outlet gap while the casting bob assembly is being transported from one casting tube to another, the transport sleeve being slidable along the bore of each casting tube when inserted therein; and
      (ii) securing means for releasably securing the transport sleeve in the lower end of each casting tube and sealing the lower end of each casting tube to the mounting means.

2. Apparatus according to claim 1, wherein the mounting means comprises a manifold having manifold branch outlets forming the means for feeding the gelation liquid to the casting tubes, and the securing means for releasably securing the transport sleeve in each casting tube comprises a flexible sleeve connecting each casting tube to one of the manifold branch outlets and a hose clamp on the flexible tube for retaining the transport sleeve therein.

* * * * *